(12) United States Patent
Sarat

(10) Patent No.: US 6,581,122 B1
(45) Date of Patent: Jun. 17, 2003

(54) SMART CARD WHICH OPERATES WITH THE USB PROTOCOL

(75) Inventor: Jean-Marc Sarat, Belmont, CA (US)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/453,879

(22) Filed: Feb. 7, 2000

Related U.S. Application Data

(63) Continuation-in-part of application No. 09/048,009, filed on Mar. 26, 1998, now Pat. No. 6,151,647.

(51) Int. Cl.$^7$ .............................................. G06F 13/00
(52) U.S. Cl. ...................................... 710/301; 235/375
(58) Field of Search ................................ 710/301, 302, 710/305, 315, 107; 235/370, 382, 492, 375

(56) References Cited

U.S. PATENT DOCUMENTS

| | | | |
|---|---|---|---|
| 5,581,708 A | | 12/1996 | Iijima |
| 5,594,233 A | * | 1/1997 | Kenneth et al. ............. 235/492 |
| 5,613,159 A | | 3/1997 | Colnot |
| 5,638,530 A | | 6/1997 | Pawate et al. |
| 5,679,945 A | | 10/1997 | Renner et al. |
| 5,721,781 A | | 2/1998 | Deo et al. |
| 5,832,240 A | | 11/1998 | Larsen et al. |
| 5,847,372 A | * | 12/1998 | Kreft ........................... 235/492 |
| 6,151,647 A | * | 11/2000 | Sarat ........................... 710/301 |
| 6,168,077 B1 | * | 1/2001 | Gray et al. .................. 235/380 |
| 6,199,128 B1 | * | 3/2001 | Sarat ........................... 710/301 |
| 6,439,464 B1 | * | 8/2002 | Fruhauf et al. ............. 235/492 |

* cited by examiner

*Primary Examiner*—Glenn A. Auve
(74) *Attorney, Agent, or Firm*—Burns, Doane, Swecker & Mathis, L.L.P.

(57) ABSTRACT

A smart card that is compatible with the USB protocol and may be compatible with multiple different protocols includes a standard set of contacts that comply with the protocols of a published standard. Another contact, not designated by the standard, may be added and used to indicate whether the card is to operate in one of a number of protocol modes. When the card is to operate in the USB mode, a simple start-up procedure is employed which does not require strict timing constraints, enabling a less expensive interface device to be used. The interface device can be connected to any bus of a computer which operates in accordance with a desired protocol. Due to the flexibility and functionality offered by smart cards that have microprocessors incorporated therein, the multi-protocol smart card can be used to drive, or otherwise communicate with, any of a variety of peripheral devices, whether or not a personal computer is present in the system. The smart card can also be configured to function as a hub between a computer CPU and peripheral devices connected to the USB by being fitted with two USB ports to allow for simultaneous communication between the CPU and the peripheral devices.

12 Claims, 6 Drawing Sheets

SMART CARD WHICH OPERATES WITH THE USB PROTOCOL

CROSS-REFERENCE TO RELATED APPLICATIONS

Referenced-applications

This is a continuation-in-part of application Ser. No. 09/048,009 now U.S. Pat. No. 6,151,647, filed Mar. 26, 1998, the contents of which are incorporated herein by reference thereto.

STATEMENT REGARDING FEDERALLY SPONSORED RESEARCH

Not Applicable.

REFERENCE TO A MICROFICHE APPENDIX

Not Applicable.

BACKGROUND OF THE INVENTION

1. Description of the Related Art

The use of secure smart cards that provide information specific to an individual is becoming more prevalent in a number of different types of situations. Examples of such include electronic commerce, security access control and health care record maintenance. Each system which employs smart cards contains two fundamental components, namely the smart cards themselves and an interface device, commonly known as a reader. The smart cards are carried by the users of the system, and include a memory which stores information that is pertinent to the user's interaction with the system. In an electronic commerce system, for example, each smart card may contain the balance in an account maintained by the user, as well as details of account transactions. More recently, the smart cards also include microprocessors, which provide for an increased level of security over the information stored in the cards. The incorporation of microprocessors into the cards also enhances their flexibility, for instance by facilitating the storage of executable programs in the cards that can be used to provide expanded functionality.

The readers communicate with the cards in a secure manner to access the information stored therein. In one type of system, the card is inserted into a slot in the reader, which brings electrical contacts in the reader into engagement with mating contacts on the exterior of the card. The engaged contacts enable a microcontroller in the reader to communicate with the memory and/or microprocessor in the card. Typically, the reader is connected to a peripheral device that is associated with the particular type of system into which the reader is incorporated. In a security system, for example, the reader might be connected to an electronic lock that permits a door to be opened. In a banking system, the reader could be incorporated into an automatic teller machine.

To permit the cards and readers of different manufacturers to be compatible with one another, a set of standard specifications has been developed. One of the common standards that applies to smart cards and readers is ISO 7816, promulgated by the International Standards Organization. This standard provides specifications for the location of the electrical contacts on the exterior of the cards, as well as the functions of the electrical signals that are present at the respective contacts. In this regard, the standard provides for up to eight electrical contacts, although specific signals are defined for only five of these contacts. The standard also contains specifications for the power-up, or initialization, procedure that is carried out when a card is first inserted into the reader, and the protocol for communicating between the card and the reader.

Due to the need to comply with the published standards, a conventional card reader can turn out to be a relatively expensive item of equipment. For instance, the ISO standard requires that different respective signals be applied to the five designated contacts on the card in a specific sequence at predetermined times during the power-up procedure. As a result, the reader must include a controller which supervises the application and timing of these signals, thereby adding to its cost.

In many systems which currently employ smart cards, the number of users can be quite large. For example, in an electronic banking system, a considerable number of customers might be expected to access an automated teller machine each day. Consequently, the cost of the reader is amortized over a sufficient number of transactions that it can be readily justified by the provider of the services.

More recently, there has been a trend toward personalized types of smart card applications. For instance, the ability to execute software programs from a microprocessor-based smart card makes it desirable to be able to connect the card to a personal computer. One approach for doing this is to add a smart card reader to the computer, either as an integral device or as a peripheral add-on. However, due to the appreciable cost of a reader, personal computer users may not be inclined to adopt this approach. In contrast to large institutions such as banks and the like, individual computer users may not be able to amortize the cost of the reader over a sufficient number of transactions to justify its cost.

Another limitation associated with the ISO protocol is that it provides relatively slow exchange of data between the smart card and the reader or other peripheral devices. For cards which have a small amount of internal memory and therefore store a limited amount of data, the slow speed is not a major concern. However, as technology progresses, the current trend is to provide larger amounts of storage capacity in smart cards, e.g. one million bytes of data. At slow transfer rates, the time that is required to load this amount of data can become significant. In particular, during manufacturing operations where each card is electronically personalized, slow data transfer rates can present a considerable bottleneck in the overall process.

It is desirable therefore, to be able to use protocols other than the ISO standard protocol, to thereby reduce the costs for card readers as well as increase data transfer rates. Consistent with this objective, however, it is further desirable to maintain compatibility with currently existing smart card systems that comply with established standards.

2. Field of the Invention

The present invention is directed to microprocessor-based user cards, commonly known as "smart cards", and more particularly to a smart card that is capable of communicating with a variety of external devices using different protocols that are respectively associated with the various devices.

BRIEF SUMMARY OF THE INVENTION

In accordance with the present invention, these objectives are achieved by providing a smart card that is compatible with multiple different protocols. In a preferred embodiment, the present invention utilizes the Universal Serial Bus (USB) protocol to allow a smart card to communicate with other peripheral devices at rates that are 10–100 times faster than the rates associated with the ISO protocol.

Such a card may be fully compatible with the protocols of the ISO standard and the USB protocol. One of the contacts of the card which is not designated by the ISO standard is used to indicate whether the card is to operate in the ISO-standard mode, or in the USB mode. When no signal is present at this terminal, the card operates in the conventional ISO-standard mode. However, the presence of one or more predetermined signals provides an indication that the card is to operate in a USB mode.

In a specific embodiment, the USB mode can be used for standard communication protocols with personal computers. An interface device which communicates with a multi-protocol smart card can be connected to any bus of the computer which operates in accordance with the USB protocol. For example, the interface device can be connected directly to the computer system's bus, where it can act as either a master or a slave. Acting as a master, this device can be made operative to control other peripheral devices also connected to the bus.

The applications of the multi-protocol card are not limited to communications with personal computers. Due to the flexibility and functionality offered by smart cards that have microprocessors incorporated therein, the multi-protocol smart card can be used to drive, or otherwise communicate with, any of a variety of peripheral devices, whether or not a personal computer is present in the system.

Further features of the invention, and the advantages offered thereby, are explained in detail hereinafter, with reference to specific embodiments of the invention illustrated in the accompanying drawings.

DETAILED DESCRIPTION OF THE INVENTION

To facilitate an understanding of the principles and features of the present invention, it is described hereinafter in the context of a specific embodiment. In particular, reference is made to implementations of the invention in which a smart card can be connected to a personal computer. It will be appreciated, however, that the practical applications of the invention are not limited to this particular embodiment. Rather, the invention can be employed in a variety of different systems in which it is desirable to utilize the functionality of a smart card.

Figure 1:
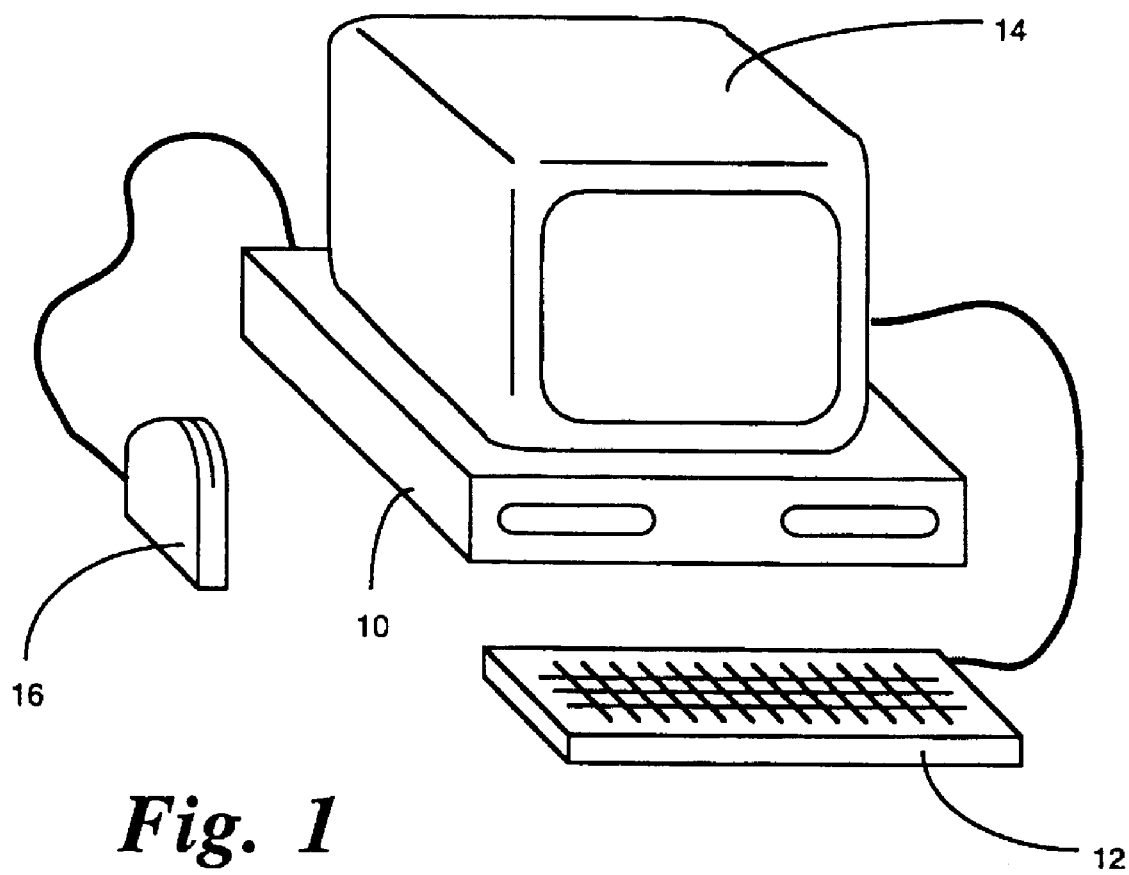
FIG. 1 is a perspective view of a personal computer system which is configured to operate with a smart card.

FIG. 1 is an illustration of a conventional personal computer system which is configured to operate with a smart card. As is typical, the computer system might include a central processing unit (CPU) 10 and the basic input and output devices that are employed by the user to interact with programs being executed by the CPU, such as a keyboard 12 and a monitor 14. In addition, the system shown in FIG. 1 includes a smart card reader 16 as another peripheral device.

The reader can be connected to the CPU via a standard input/output port. Alternatively, the structure of the reader might be incorporated into the housing for the CPU or the keyboard, which would then include an appropriate slot for insertion of the smart card.

A configuration such as that shown in FIG. 1 might be desirable for a variety of different applications. At a first level, the smart card can be used to control access to the personal computer. For instance, before the user is allowed to run a particular program or open a sensitive file, he or she may be required to insert his or her personal smart card into the reader 16 and enter a password via the keyboard 12. In a known manner, the smart card and the reader communicate with one another to authenticate the password, and thereafter authorize the computer to operate in the manner commanded by the user. In a more sophisticated application, the smart card might include one or more personalized software programs which can be executed by the microprocessor in the smart card and interact with the CPU, such as an electronic banking program.

In accordance with the present invention, the smart card is capable of operating in a mode other than that which is defined by the ISO standard. In particular, the smart card operates in accordance with the USB protocol, and can communicate directly with various peripheral devices by means of a USB connection, such as the keyboard 12, without the intervention of the CPU, and thereby provide a more secure path for the transfer of personalized data, such as a password. In addition, when operating in such a mode, an ISO-compliant reader is not required, thereby reducing the cost required to configure the computer to work with a smart card.

In a preferred embodiment of the invention, the smart card is capable of selectively operating in both a standard, ISO-compliant mode, and at least one USB mode, to optimize its utility. In this manner, the smart card can be used with established systems that are commonly associated with ISO readers, such as building access control, electronic banking transactions, and the like. In addition, it can also be used for other, less frequently employed features, such as to gain access to a protected personal computer.

Figure 2:
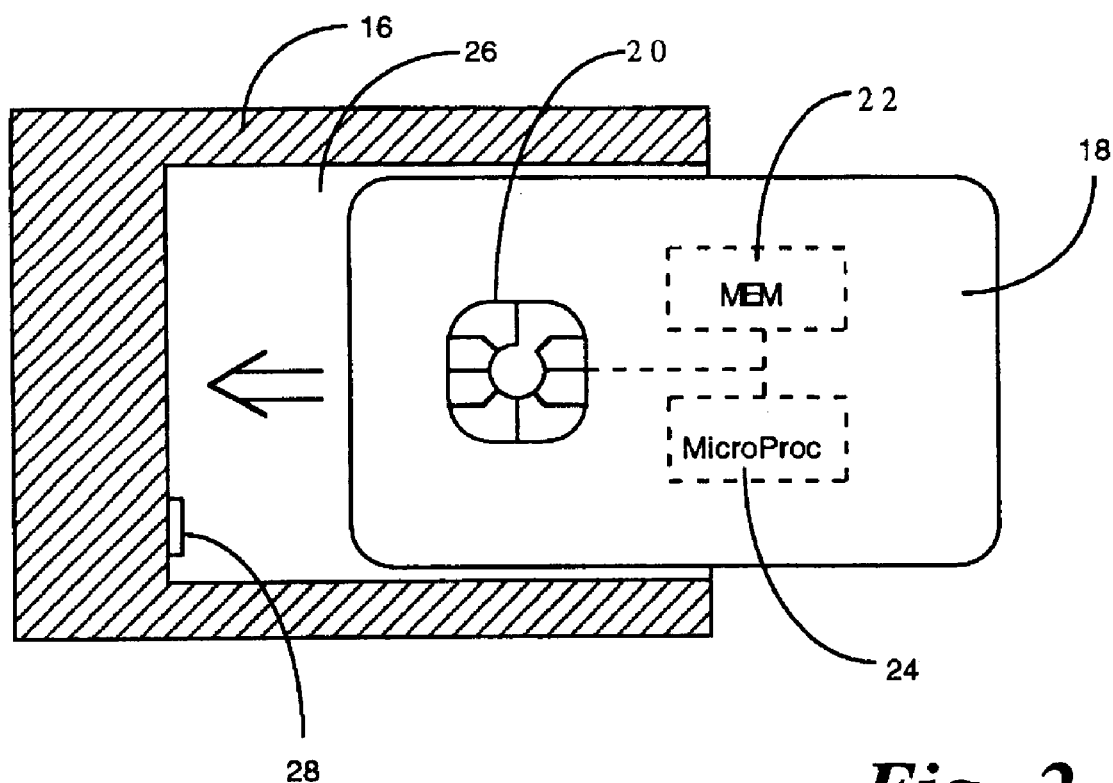
FIG. 2 is a plan view of a smart card and a reader.

The basic structure of a smart card system, insofar as it pertains to one embodiment of the present invention, is illustrated in FIG. 2. Generally speaking, a smart card 18 is a user card made of plastic or other suitable material, similar to a common credit card, and having a number of electrical contacts 20 on one exterior surface thereof. Embedded within the structure of the card is an electronic memory 22 and, in a preferred embodiment of the invention, a microprocessor 24. For ease of illustration, in FIG. 2 the memory 22 and microprocessor 24 are shown offset from the contacts 20, but in practice they can be located directly beneath the contacts. The dimensions of the card 18, and the arrangement and location of the contacts 20, are determined by applicable standards. The particular card shown in FIG. 2 has eight such contacts, although cards with only six contacts also comply with known standards.

The reader 16 has a slot 26 that is appropriately dimensioned to receive the card 18. The bottom of the slot has a switch 28, or other form of sensor, to detect when the card is fully inserted into the slot. The interior surface of the slot has a set of mating contacts (not shown), which engage corresponding contacts 20 on the card when it is fully inserted. When the sensor detects that a card is completely inserted into the slot 26 of the reader, it sends a signal which causes the reader to initiate a power-up procedure.

Figure 3:
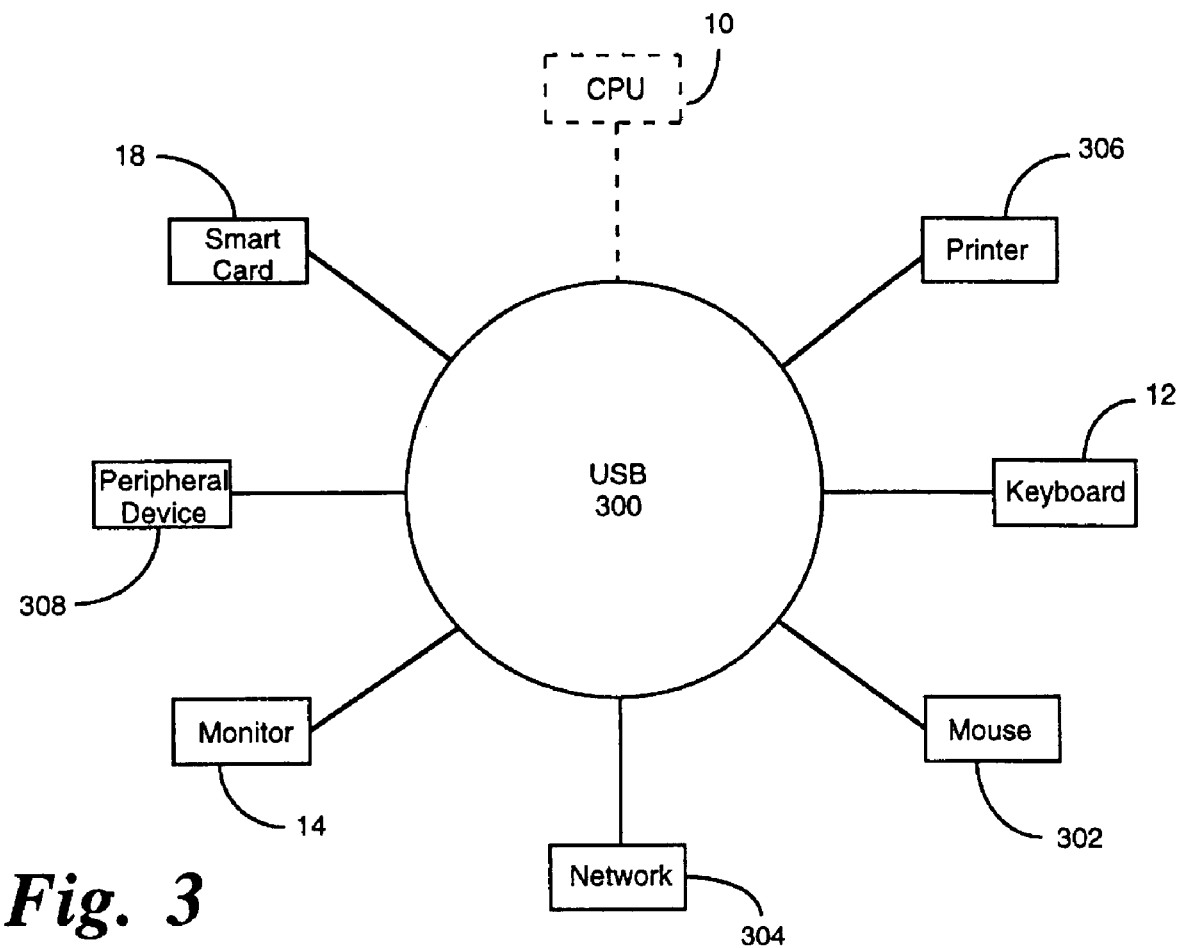
FIG. 3 is a diagram of multiple peripheral devices connected via a Universal Serial Bus.

The configuration of multiple peripheral devices in communication with each other utilizing the USB is shown in FIG. 3. In this configuration the smart card 18, which, depending on the protocol to be used, may be inserted into the reader 16, can act as master in a master-slave relationship with the various peripheral devices connected via the USB 300. This can occur with or without a computer CPU 10 also connected to the USB 300. Normally, the CPU 10 is connected to the USB 300 and acts as master to the various other peripheral devices. In one embodiment of the present invention, the CPU 10 is not connected to the USB 300 and the smart card acts as the master to the various other peripheral devices. In another embodiment, the CPU 10 is connected to the USB 300 and is treated as one of the peripheral devices connected to the USB 300, thus allowing the smart card to control the communications from the CPU 10 to any other peripheral devices, especially during critical communication times such as password verification times.

Figure 4:
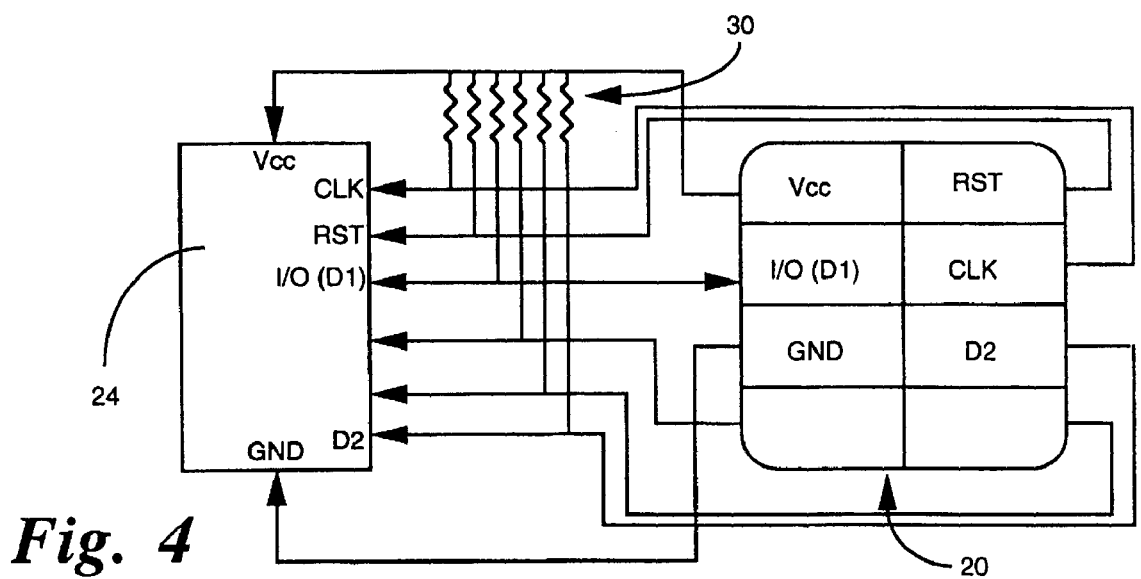
FIG. 4 is a more detailed view of the electronic components of a smart card.

An expanded view of the contacts 20 on the smart card, and their connection to the internal microprocessor 24 of the card, is illustrated in FIG. 4. Referring thereto, the ISO standard specifies the particular type of signal that is associated with five of the eight contacts. These signals include power (Vcc), ground, reset, clock and I/O. The other three contacts are not assigned to any signal, and therefore are not used under the ISO protocol. Each of the contacts 20 is connected to the microprocessor 24 by means of a pull-up resistor 30, so that, in the absence of a signal at a given contact, the input signal to the microprocessor 24 is at a logical high level. Hence, the signals at the unassigned contacts always remain at the logic high level.

In operation, when a card 18 is inserted into the slot 26 of the reader 16, it actuates the sensor 28 when it reaches the end of travel in the direction of the arrow shown in FIG. 2. Upon receipt of a signal from the sensor, a microcontroller (not shown) within the reader applies the appropriate signals to the contacts 20 of the card, in a predetermined order specified by the protocol to be used.

In accordance with the present invention, one or more of the unassigned contacts is used to expand the functionality of the smart card, by enabling it to operate in accordance with the USB protocol. In particular, the USB protocol employs two data lines, e.g. D1 and D2, for transmission in a differential mode, as well as two power lines, Vcc and GND. The data clock is encoded along with the differential data. Pursuant to the invention; the I/O contact associated with the ISO standard is employed as one of the two data contacts for the USB protocol, e.g. D1, and one of the unassigned contacts is employed as the other of the two data contacts, D2.

Figure 5A:
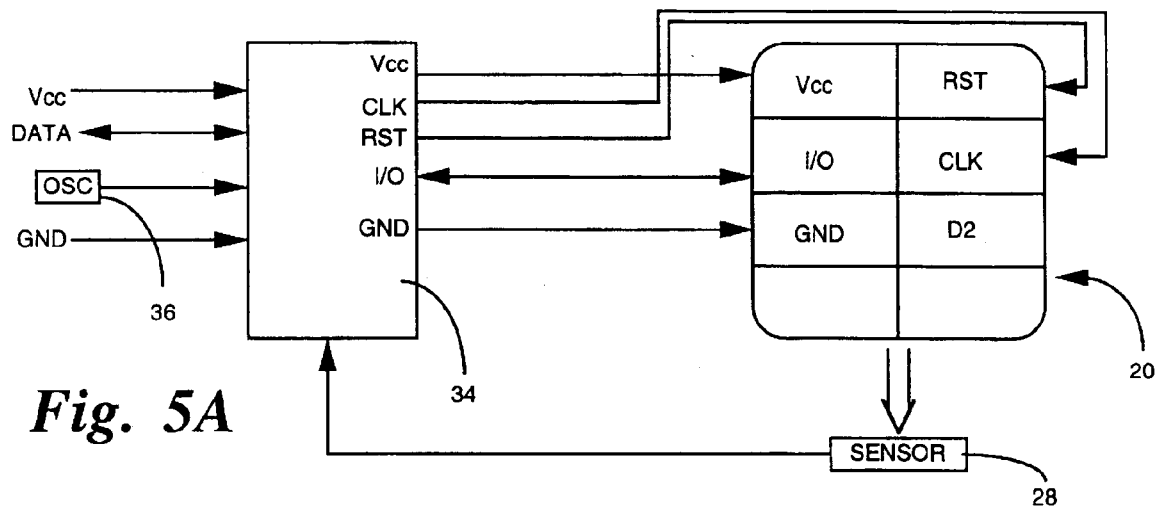
FIG. 5A is a block diagram of a reader that conforms to the ISO standard.

FIG. 5A illustrates the card in a reader that conforms to the ISO standard. That standard requires that each of the respective signals be applied to the five designated contacts of the card in a predetermined order, and with strictly controlled timing, during the power-up procedure. To provide the necessary control over the application of the signals, therefore, the reader 16 includes a microcontroller 34 which receives, as input signals, the Vcc and ground power signals, as well as a clock signal that is derived from a crystal oscillator 36, or the like. Depending upon the particular application, the microcontroller might receive data signals that are provided from an external source. The microcontroller 34 also receives a signal from the sensor 28, which indicates when the card 18 is fully inserted into the slot 26 in the reader. In response to this signal, the microcontroller controls the application of the respective signals to each of the five assigned contacts of the card.

Figure 5B:
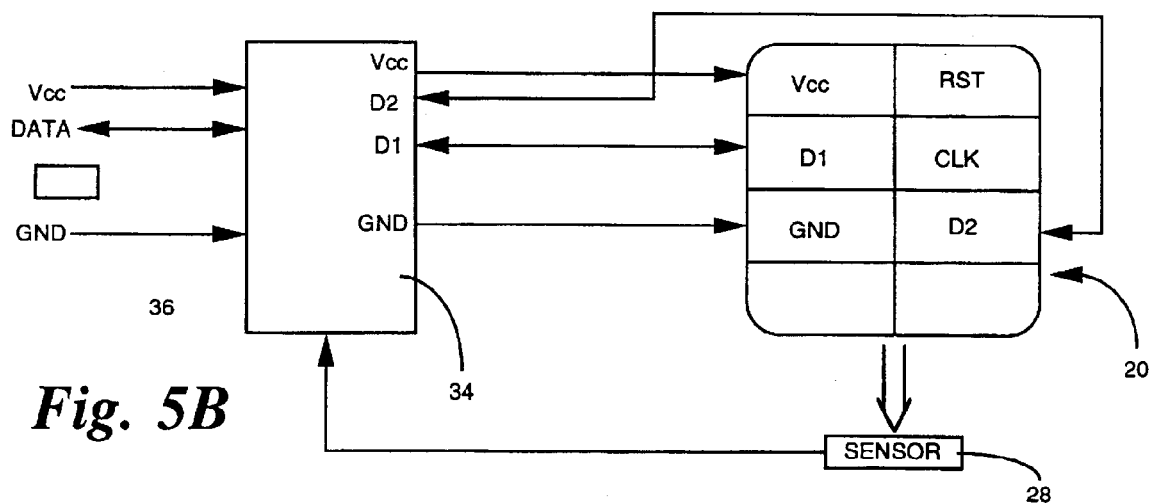
FIG. 5B is a schematic diagram of an interface device in accordance with an embodiment of the present invention.

FIG. 5B illustrates the card connected to a USB device. The sixth contact, in this case the D2 contact, can used to identify whether the card should operate in the ISO mode or in a USB mode. More particularly, the USB protocol provides for two different modes of communication, a high-speed mode and a low-speed mode. Nominally, in the high-speed mode, data is transferred at a rate of about 12 Mb/s, whereas in the low-speed mode the data transfer rate is about 1.5 Mb/s. The two data contacts can be used together to indicate which mode of operation is appropriate for the connector in which the card is inserted, as illustrated in the following table:

TABLE t1

| D1 | D2 | Mode |
|----|----|------|
| 5  | 5  | None |
| 5  | 3  | High |
| 3  | 5  | Low  |
| 0  | 5  | ISO  |

In this example, the contacts of the card are normally pulled up to the Vcc level (in this case 5 volts) when there is no input from an external device. Hence, when both of the data contacts are at a level of 5 volts, an indication is provided that there is no applicable protocol to employ. If the card is inserted in an ISO-compliant reader, the I/O contact (i.e. D1) is normally pulled low during the power-up routine, whereas the D2 contact is unconnected, and therefore remains at Vcc (5 volts). Upon detecting this condition, the microprocessor 24 operates in accordance with the ISO protocol. In the two USB modes, one of the contacts is pulled down to an intermediate signal level, e.g. 3 volts, and the other remains at Vcc. The particular contact that is set at the intermediate level may be determined by a pull-up resistor on one of the two data lines in the USB host device to which the card is connected, and thereby indicates whether the high-speed or the low-speed mode of communication is to be employed in connection with that device. Upon sensing either of these conditions for a predetermined period of time, the microprocessor 24 switches into the appropriate one of the two USB modes.

As representative examples which might be employed to achieve these operations, the pull-up resistor 30 for the regular I/O line, i.e. D1, might have a value of 150 kΩ, whereas that for the D2 line can be 1.5 kΩ, and the pull-down resistor in the USB host device can be 15 kΩ.

The ability to employ the USB protocol to transfer data to and from the smart card offers a number of advantages. First, since the USB connections are relatively simple, and the protocol does not require the strict reset procedure of the ISO protocol, devices which are substantially simpler than an ISO-compliant reader can be used to connect the card to other devices, thereby reducing expense considerably. In one embodiment, the connector can be as simple as a short length of cable with four pins at one end to connect to the contacts 20, and a standard USB plug on the other end. Since USB ports are becoming commonplace on a number of different types of devices, the ability to use the card with these devices is facilitated. Hence, without any modification, a personal computer with a USB port is inherently smart-card enabled.

Another significant advantage lies in the data transfer speeds that are provided by the USB protocol. As a result of higher transfer rates, it becomes feasible to load larger amounts of data into the smart cards, and thereby effectively employ the capacity of a larger internal memory. For instance, during the manufacture of a card, an application program can be loaded into the card's memory using the high-speed streaming USB mode, to thereby minimize the amount of time required during manufacture. Once the card is employed by the user, however, it can interact with a standard ISO-compliant reader during the running of the application program. Thus, new applications for the smart card become possible without having to install new readers in the field. However, where USB connectors are available for the smart cards, then the higher data transfer speeds that are available with this protocol, can be employed during the use of the card, as well as in the manufacturing process. This capability is particularly advantageous for applications such as bulk encryption and decryption, where the card can operate as a pass-through device.

Another advantage that stems from the ability to operate in accordance with the USB protocol lies in the fact that the card can communicate directly with devices that employ this protocol. The ability of the smart card to act as master for other USB peripheral devices, and eliminate the CPU from the connection between the smart card and the peripheral devices, provides a secure channel for the transfer of sensitive data. For example, in a situation where the user enters his or her password via a keyboard, that data is transmitted directly to the smart card, without going to the CPU. Once the proper password has been entered, the functionality provided by the smart card can then be employed in connection with a personal computer. For example, electronic banking transactions can be carried out in connection with account information that is securely stored in the smart card.

From the foregoing, it will be appreciated that the ability to operate the smart card in accordance with different protocols permits the smart card to be used in connection with a variety of different types of peripheral devices. While the example of the password given above utilizes a personal computer with a keyboard, it is not necessary that an external CPU be present. Rather, the smart card could be used with standalone devices, such as a PIN pad for entering passwords, a display device, or a modem. The only requirement is a USB interface device for the smart card, either within the device itself or connected thereto. All of the functionality that is needed to operate the device can be contained within the smart card itself. A particular advantage of this arrangement resides in the fact that executable programs, such as applets written in the JAVA programming language, can be downloaded into the smart card, and then used to control the peripheral device to provide a variety of different functions. Since the JAVA programming language is not platform specific, the peripheral device need not be uniquely associated with a given card. Rather, USB-capable devices from a variety of different manufacturers can be operated with the same card.

This type of operation provides additional security as well. Since all of the operations of the device are managed by the card itself, there is no need to provide any form of intelligence within the device itself, or to store any secure type of information therein. Furthermore, while the multi-protocol card offers this expanded range of functionality, it still remains compatible with the ISO standard, and therefore can be used for conventional smart card applications.

It will be appreciated by those of ordinary skill in the art that the present invention can be embodied in other specific forms without departing from the spirit or essential characteristics thereof. For example, while the disclosed embodiments depict a card which can selectively operate in accordance with the ISO protocol and the USB protocol, it is possible to employ a greater number of protocols for greater flexibility. For instance, the normally unused seventh and eighth contacts can be employed to indicate that one or more additional protocols are to be used. Alternatively, signals provided over one or both of the data channels can identify any one of a plurality of different protocols to be used in a non-USB mode.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

DEPOSIT OF COMPUTER PROGRAM LISTINGS

Not Applicable.

What is claimed is:

1. A USB protocol smart card system, comprising:
a user card containing a microprocessor and associated memory, and a plurality of contacts for transferring data to and from said microprocessor and memory, said contacts including a first set of contacts respectively associated with a set of signals that conform to an ISO protocol, said set of contacts including a first data contact;
a second data contact in addition to the contacts in said set of contacts; and
an interface device for connection to said user card, and having a set of mating contacts which correspond to the contacts in said user card, to transfer data between said user card and said interface device via said first and second contacts in accordance with the USB protocol.

2. The smart card system of claim 1, wherein said second data contact of the user card is not used when said user card operates in accordance with said ISO protocol.

3. The smart card system of claim 1, wherein said second data contact is normally maintained at a predetermined voltage level during operation in accordance with said ISO protocol, and said interface device switches said second data contact to a different voltage level when the user card is to operate in accordance with said USB protocol.

4. The smart card system of claim 3, wherein said USB protocol provides for two modes of operation, and said interface device places said first and second data contacts at first and second voltage levels, respectively, when one of said modes of operation is to be employed, and places said first and second data contacts at said second and first voltage levels, respectively, when the other of said modes of operation is to be employed.

5. A USB protocol smart card, having:
a plurality of contacts for transferring data to and from said card, said contacts including a first set of contacts respectively associated with a set of signals that conform to an ISO protocol, said set of contacts including a first data contact;
a second data contact in addition to the contacts in said set of contacts; and
a microprocessor responsive to signals on said first and second data contacts for transferring data in accordance with said ISO protocol when a first pair of predetermined voltage levels are present at said first and second data contacts, and for transferring data in accordance with a USB protocol when a second pair of predetermined voltage levels are present at said first and second data contacts.

6. The smart card of claim 5, wherein said second data contact is not employed to transfer data when said microprocessor operates in accordance with said ISO protocol.

7. The smart card of claim 5 wherein said USB protocol provides for two modes of operation, and said microprocessor operates in one of said modes when said second pair of predetermined voltage levels are present at said first and second data contacts, and operates in the other of said modes when a third pair of predetermined voltage levels are present at said first and second data contacts.

8. The smart card of claim 7 wherein said third pair of voltage levels is the inverse of said second pair of voltage levels.

9. The smart card of claim 7 wherein said two modes of operation respectively pertain to different rates for transferring data.

10. A smart card system, comprising:

a user card having a microprocessor, an associated memory storing at least one application program, and a plurality of contacts comprising a set of contacts, including a first data contact, which are respectively associated with a set of signals that conform to an ISO protocol, and a second data contact in addition to the contacts in said set of contacts for transferring data to and/or from said microprocessor and memory;

a peripheral device which is operable in accordance with said application program; and a connector for connecting said peripheral device with said contacts to thereby enable said microprocessor to communicate with said peripheral device via said first and second data contacts, in conformance with the USB standard, to control the operation of said peripheral device in accordance with said application program.

11. The smart card system of claim 10, wherein said peripheral device does not contain a processor.

12. The smart card system of claim 10, wherein said peripheral device comprises one of a PIN pad, a display device or a modem.

* * * * *